United States Patent
Bryan et al.

(10) Patent No.: US 11,429,926 B2
(45) Date of Patent: Aug. 30, 2022

(54) MOBILE CAMERA-EQUIPPED DEVICE-BASED APPROACH TO ASSESSING A DISPLAY

(71) Applicant: Walmart Apollo, LLC, Bentonville, AR (US)

(72) Inventors: Greg A. Bryan, Centerton, AR (US); Eric A. Letson, Bentonville, AR (US); John P. Thompson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 160 days.

(21) Appl. No.: 15/429,313

(22) Filed: Feb. 10, 2017

(65) Prior Publication Data
US 2017/0236090 A1    Aug. 17, 2017

Related U.S. Application Data

(60) Provisional application No. 62/293,903, filed on Feb. 11, 2016.

(51) Int. Cl.
*G06Q 10/08* (2012.01)
*H04N 7/18* (2006.01)
(Continued)

(52) U.S. Cl.
CPC ....... *G06Q 10/087* (2013.01); *H04N 5/23293* (2013.01); *H04N 5/272* (2013.01); *H04N 7/183* (2013.01); *H04N 7/185* (2013.01)

(58) Field of Classification Search
CPC ...... G06Q 10/08; G06Q 30/09; G06Q 10/081; G09G 5/377; G06K 7/10; H04N 7/185;
(Continued)

(56) References Cited

U.S. PATENT DOCUMENTS 7,957,998 B2    6/2011    Riley
8,189,855 B2 *  5/2012    Opalach ............... G06Q 10/087
                                                     382/100
(Continued)

FOREIGN PATENT DOCUMENTS

WO    1995030201    11/1995
WO    2013147883    10/2013

OTHER PUBLICATIONS

"Gerry Byrne, What are Live images and why are they essential for planograms, Apr. 21, 2015, https://shelfstock.ie/what-are-live-images-and-why-are-they-essential-for-planograms/" (Year: 2015).*

(Continued)

*Primary Examiner* — Florian M Zeender
*Assistant Examiner* — Vanessa Deligi
(74) *Attorney, Agent, or Firm* — Fitch, Even, Tabin & Flannery LLP

(57) ABSTRACT

The appearance of a properly-configured display that includes a plurality of discrete components is specified and then at least one image is formed that includes the appearance of the properly-configured display. The image (or images) and corresponding information regarding the discrete loose components is provided to a retail shopping facility and used in conjunction with a mobile camera-equipped device to visually overlay the image over a view of a display to thereby facilitate comparing the display with the appearance of a properly-configured display.

14 Claims, 4 Drawing Sheets

(51) Int. Cl.
*H04N 5/232* (2006.01)
*H04N 5/272* (2006.01)

(58) Field of Classification Search
CPC .... H04N 5/23293; H04N 7/183; H04N 5/272; H04N 5/2621
See application file for complete search history.

(56) References Cited

U.S. PATENT DOCUMENTS

| | | | | |
|---|---|---|---|---|
| 8,429,004 | B2* | 4/2013 | Hamilton | G06Q 10/06 705/7.41 |
| 8,941,645 | B2* | 1/2015 | Grimaud | G06Q 10/087 345/419 |
| 9,959,674 | B2* | 5/2018 | Chen | G06F 3/011 |
| 10,031,974 | B1* | 7/2018 | Abdullah | G06F 17/30864 |
| 2006/0190341 | A1* | 8/2006 | Riley | G06Q 10/0631 705/1.1 |
| 2009/0063306 | A1* | 3/2009 | Fano | G06Q 20/203 705/28 |
| 2012/0022913 | A1* | 1/2012 | Volkmann | G06Q 10/087 705/7.29 |
| 2013/0051611 | A1* | 2/2013 | Hicks | G06Q 10/0875 382/103 |
| 2014/0201040 | A1* | 7/2014 | Birch | G06T 11/00 705/28 |
| 2014/0324642 | A1* | 10/2014 | Winkel | G06Q 10/087 705/28 |
| 2015/0088703 | A1* | 3/2015 | Yan | G06Q 10/087 705/28 |
| 2015/0363758 | A1* | 12/2015 | Wu | G06Q 20/201 705/20 |
| 2017/0178061 | A1* | 6/2017 | Griffin | G06Q 10/087 |
| 2017/0193430 | A1* | 7/2017 | Barreira Avegliano | B64C 39/024 |
| 2018/0068256 | A1* | 3/2018 | Marder | G06Q 10/087 |
| 2020/0005225 | A1* | 1/2020 | Chaubard | G06V 10/40 |

OTHER PUBLICATIONS

Galvez, John; Tesco Uses IMB Augmented Reality Mobile App to Manage Product Placement; IBM Newsroom; http://www-03.ibm.com/press/uk/en/pressrelease/43319.wss; Feb. 26, 2014; pp. 1-3.
Wiles, Stephanie, Nishant Kumar, Bidisha Roy, Udai Rathore; "Planogram Compliance: Making it Work;" Cognizant 20-20 Insights; pp. 1-7.
UKIPO; App. No. GB1702225.2; Combined Search and Examination Report dated Jul. 14, 2017; pp. 1-6.
Global Retail Business Solutions; "Creating your first planogram: A step-by-step guide"; Aug. 2015; pp. 1-12.
Heath Company; "Assembling and Using Your . . . Heathkit"; May 20, 1955; pp. 1-24.
Hunter Fan Company; "installation and operation manual for Hunder Ceiling Fans"; May 3, 2007; pp. 1-15.
Jordan, Larry; "The Definitive Guide to Building Your Own Birdhouses"; Available at least as early as 2010; pp. 1-45.
Prism Retail Services; "Prism Merchandiser Training Manual for CVS Pharmacy"; Aug. 18, 20018; pp. 1-21.
UKIPO; App. No. 1702225.2; Office Action dated Apr. 2, 2020.

* cited by examiner

MOBILE CAMERA-EQUIPPED DEVICE-BASED APPROACH TO ASSESSING A DISPLAY

CROSS-REFERENCE TO RELATED APPLICATION

This application claims the benefit of U.S. Provisional Application No. 62/293,903, filed Feb. 11, 2016, which is incorporated herein by reference in its entirety.

TECHNICAL FIELD

These teachings relate generally to product displays.

BACKGROUND

A typical retail shopping facility includes numerous products that are offered for sale. In some cases the products are simply placed on a shelf with no special consideration for theme or layout. In other cases the display reflects adherence to a planogram or other specific set of instructions. A properly configured display can help to attract the consumer's eye, can suggest useful and synergistic purchasing opportunities and combinations of products, and can otherwise help to both inform the consumer and drive sales.

With these and other related benefits in mind, instructions regarding how to prepare a properly-configured display are often thoughtfully put together and disseminated from a centralized location to a plurality of retail shopping facilities that are owned and/or operated by a given enterprise. Unfortunately, store-based noncompliance with such instructions often undercuts the hoped-for benefits.

Such noncompliance arises from a number of root causes including but not limited to time constraints, associate training, and the sheer number of such displays that must be configured in the course of a given work period. Display configuration errors, in turn, can include failing to include one or more specified products in the display, failing to include a proper number of such items, and failing to arrange the products in a particular way with respect to one another and with respect to the display infrastructure.

BRIEF DESCRIPTION OF THE DRAWINGS

The above needs are at least partially met through provision of a mobile camera-equipped device-based approach to assessing a display described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments provide for specifying the appearance of a properly-configured display that includes a plurality of discrete components and then forming at least one image that includes the appearance of the properly-configured display. The image (or images) and corresponding information regarding the discrete loose components is provided to a retail shopping facility and used in conjunction with a mobile camera-equipped device to visually overlay the image over a view of an actual display to thereby facilitate comparing the actual display with the appearance of a properly-configured display.

By one approach the aforementioned image comprises a digital photographic image of an actual physical properly-configured display. By another approach, in lieu of the foregoing or in combination therewith, at least one such image can comprise a virtual representation of a properly-configured display.

By one approach the image includes the appearance of an incomplete though properly-configured (so far) display. Such an image can be overlaid over a view of a partially-completed actual display to assess whether the actual display has been, so far, properly put together.

These teachings are highly flexible in practice and will accommodate essentially any size and any shape of display. Teachings will also accommodate essentially any number of discrete loose components (i.e., products) and any combination of different products. These approaches will also accommodate a wide variety of display infrastructure and/or promotional content as desired.

Figure 1:
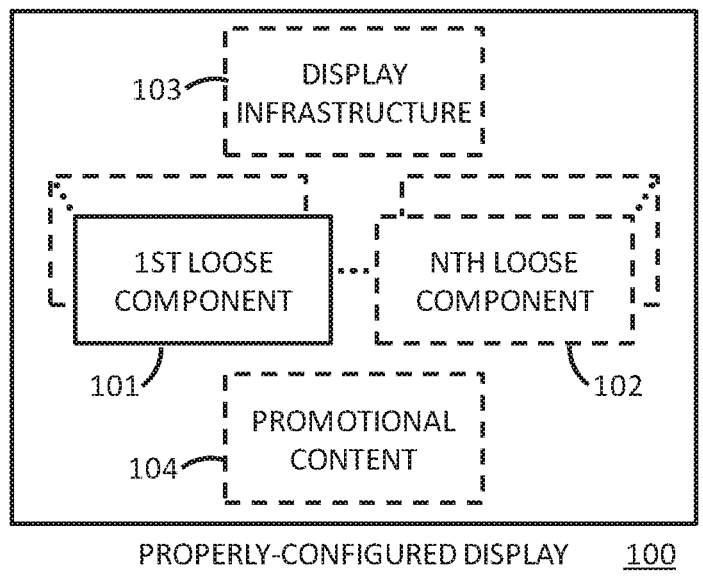
FIG. 1 comprises a block diagram as configured in accordance with various embodiments of these teachings.

These and other benefits may become clearer upon making a thorough review and study of the following detailed description. Referring now to the drawings, and in particular to FIG. 1, it may be helpful to first generally describe and characterize a properly-configured display 100.

A properly-configured display 100 includes a plurality of discrete (i.e., physically separate) loose components. These discrete loose components may comprise, for example, the plurality of a first component 101 (such as a first product such as a candy bar, a box of crackers, and so forth) and/or one or more additional Nth loose components 102 (where N is an integer greater than 1). A properly-configured display may have only a few loose components (for example, less than 12 loose components) or may have upwards of 100 or more loose components as desired. Being "loose," these components are not attached or otherwise secured to the properly-configured display 100 and accordingly a consumer is able to select one of these loose components and easily physically remove the selected component from the properly-configured display 100 and purchase that selected component.

To be clear, as used herein these loose components 101, 102 are products that are offered for retail sale. These teachings will accommodate properly-configured displays 100 that feature a plurality of a single product or that feature a plurality of different products as desired. Accordingly, as a simple example, the aforementioned plurality of discrete loose components can include a plurality of a first product and a plurality of a second product.

In addition to the discrete loose components the properly-configured display 100 will typically also include display infrastructure 103. This display infrastructure 103 can comprise, for example, horizontal shelves, bins, sidewalls, a back wall, one or more doors or drawers, cooling and/or heating elements, lighting and/or active displays (i.e., computer screens or the like), movable components (including automated components), feet, rollers, and so forth as desired.

In addition, and as desired, a properly-configured display 100 can also include discrete promotional content 104. Examples in these regards include brand logos and trade dress, images of products and serving suggestions, information regarding use and warranties, paper coupons, pricing information, recipes, and so forth.

These teachings are highly flexible in practice and will accommodate a wide variety of differently sized and differently shaped displays. These displays may be stand-alone displays or may be integrated with other displays or product presentation infrastructure. As one simple example in these regards, the properly-configured display 100 may comprise an end-cap display as is well known in the art.

Figure 2:
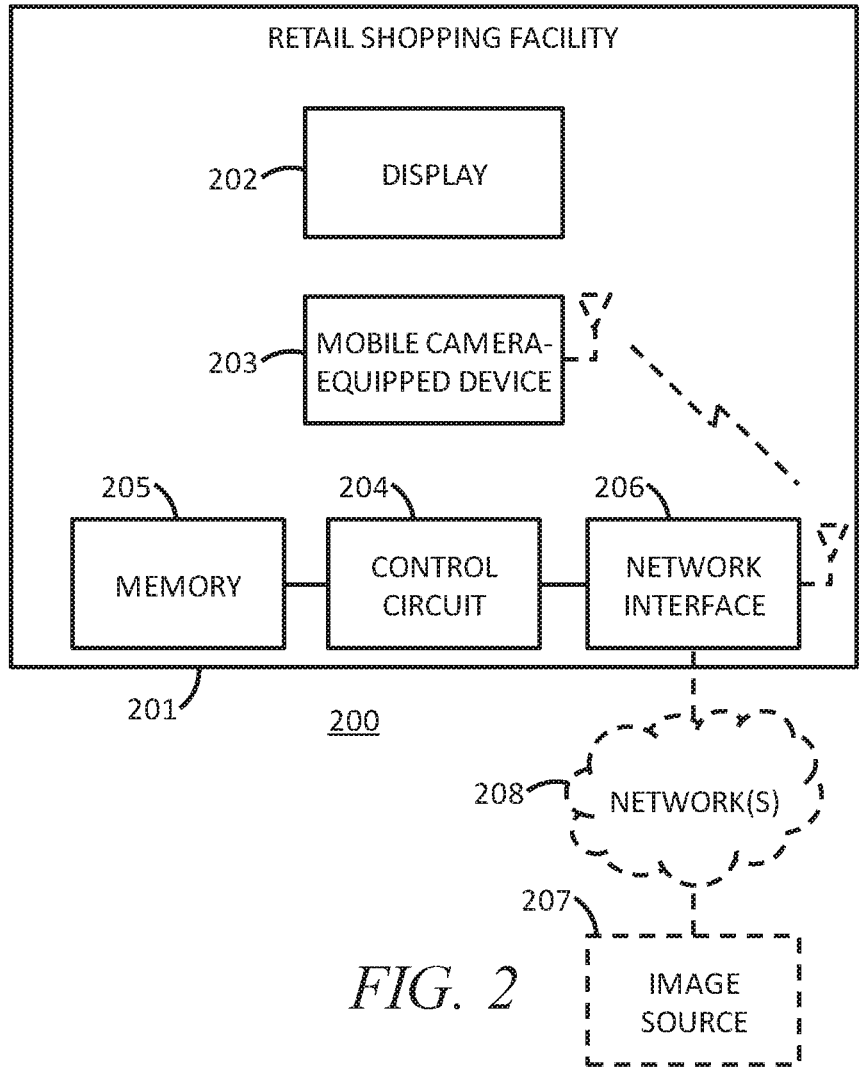
FIG. 2 comprises a block diagram as configured in accordance with various embodiments of these teachings.

FIG. 2 presents an illustrative application setting 200. This application setting 200 includes a retail shopping facility 201. This retail shopping facility 201 comprises a retail sales facility or any other type of bricks-and-mortar (i.e., physical) facility in which products are physically displayed and offered for sale to customers who physically visit the facility. The shopping facility may include one or more of sales floor areas, checkout locations (i.e., point of sale (POS) locations), customer service areas other than checkout locations (such as service areas to handle returns), parking locations, entrance and exit areas, stock room areas, stock receiving areas, hallway areas, common areas shared by merchants, and so on. The retail shopping facility 201 may be any size of format facility, and may include products from one or more merchants. For example, a facility may be a single store operated by one merchant or may be a collection of stores covering multiple merchants such as a mall.

In this illustrative example the retail shopping facility 201 also includes a display 202 (i.e., a physical display that presents a plurality of physical products as versus, say, a computer monitor which is sometimes referred to as a "display"). The present teachings provide a mechanism for helping to determine whether this display 202 is properly configured.

Figure 3:
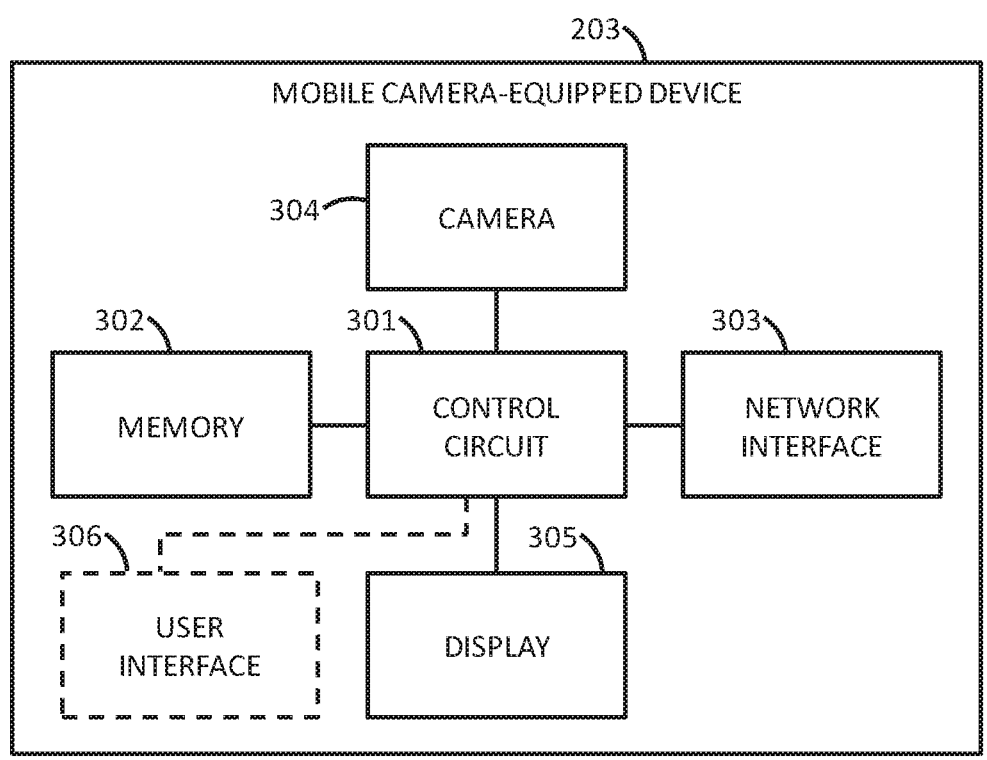
FIG. 3 comprises a block diagram as configured in accordance with various embodiments of these teachings.

The retail shopping facility 201 also includes a mobile camera-equipped device 203. Numerous such devices are known in the art. Making momentary reference to FIG. 3, the mobile camera-equipped device 203 can comprise a control circuit 301 that operably couples to a memory 302 and a network interface 303. Being a "circuit," the control circuit 301 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 301 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 301 is configured (for example, by using corresponding programming as will be well understood by those skilled in the art) to carry out one or more of the steps, actions, and/or functions described herein.

The memory 302 may be integral to the control circuit 301 or can be physically discrete (in whole or in part) from the control circuit 301 as desired. This memory 302 can also be local with respect to the control circuit 301 (where, for example, both share a common circuit board, chassis, power supply, and/or housing) or can be partially or wholly remote with respect to the control circuit 301 (where, for example, the memory 302 is physically located in another facility, metropolitan area, or even country as compared to the control circuit 301).

In addition to the image(s) and other information described herein regarding an actual display, this memory 302 can serve, for example, to non-transitorily store the computer instructions that, when executed by the control circuit 301, cause the control circuit 301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The network interface 303 provides a mechanism by which the control circuit 301 can communicate with other elements (both within the application setting 200 and external thereto). Network interfaces, including both wireless (such as, for example, Wi-Fi and cellular telephony systems) and non-wireless platforms, are well understood in the art and require no particular elaboration here.

The mobile camera-equipped device 203 further includes a digital camera 304 and a display 305 (such as an LCD display as is known in the art) that operably couples to the control circuit 301. So configured, the camera 304 can provide locally-viewed images that are rendered visible, in whole or in part, on the display 305. By one approach the mobile camera-equipped device 203 also optionally include a user interface 306 that operably couples to the control circuit 301. This user interface 306 can comprise any of a variety of user-input mechanisms (such as, but not limited to, keyboards and keypads, cursor-control devices, touch-sensitive displays, speech-recognition interfaces, gesture-recognition interfaces, and so forth) to facilitate receiving information and/or instructions from a user.

Referring again to FIG. 2, the retail shopping facility 201 can also include its own control circuit 204 that operably connects to a corresponding memory 205 and network interface 206. These components can be functionally similar or identical to the corresponding components described above with respect to the mobile camera-equipped device 203. By one approach the mobile camera-equipped device 203 communicates, either wirelessly or non-wireless, with the retail shopping facility control circuit 204.

The illustrated application setting 200 also illustrates that an image source 207 (that serves to provide one or more images of a properly-configured display 100 as described further herein) can be communicatively coupled to the retail shopping facility control circuit 204 and/or the mobile camera-equipped device 203 by one or more intervening wireless or non-wireless networks 208 such as, but not limited to, the Internet.

Figure 4:
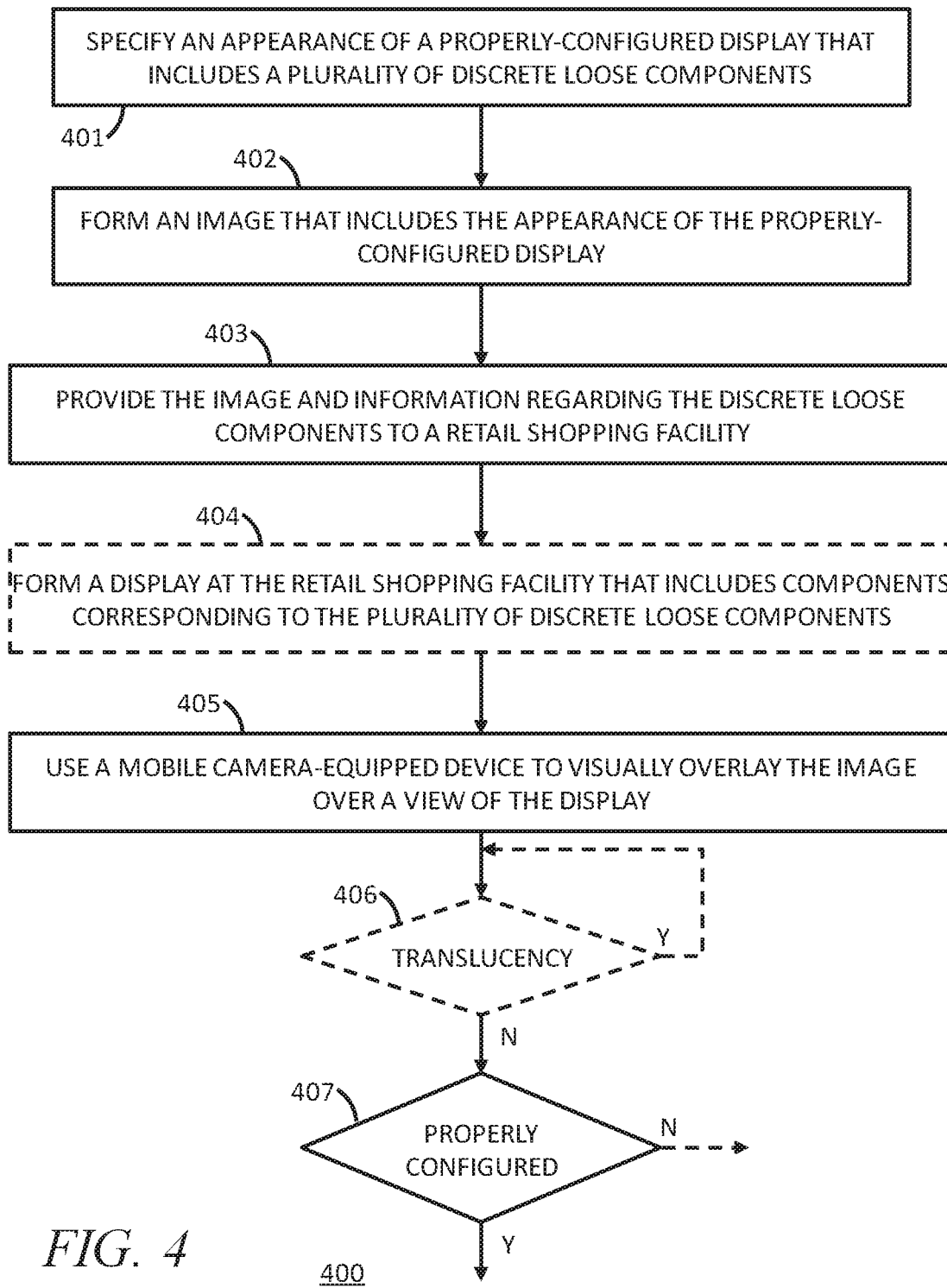
FIG. 4 comprises a flow diagram as configured in accordance with various embodiments of these teachings.

FIG. 4 presents a process 400 that can be carried out using the above-described application setting 200. Those skilled in the art will understand, however, that these teachings are not limited to the specifics of this application setting and may be practiced to a greater or lesser extent in other contexts and/or with other supporting apparatuses.

At block 401 this process 400 specifies an appearance of a properly-configured display 100 that includes a plurality of discrete loose components 101, 102. This specification may include, for example, the particular products that are to be included in the display and the relative position of those products in the display. If desired, this specification may also include details regarding the aforementioned display infrastructure 103 and/or the aforementioned promotional content 104 as well as other dimensional requirements or characteristics.

At block 402 this process 400 provides for forming an image that includes the appearance of the properly-configured display 100. These teachings presume that this image is formed in conformance with the aforementioned specifications regarding the appearance of the properly-configured display 100.

By one approach this activity includes constructing a physical example of the display and then capturing a digital photographic image of the properly-configured display 100. By another approach, in lieu of the foregoing or in combination therewith, this activity includes forming a virtual representation of the properly-configured display. Being "virtual," the image comprises a digitally-formed construct in the first instance rather than a captured image of an actual physical display. There are numerous ways of forming such a virtual image that are very well known in the art. Accordingly, for the sake of brevity, further details in those regards are not provided here.

By one approach this activity comprises forming only a single image, such as a front elevational view of the display. By another approach, in lieu of the foregoing or in combination therewith, this activity comprises forming a plurality of different images by, for example, using different fields of view of the properly-configured display 100.

By one approach this activity comprises forming an image of a completed properly-configured display 100. If desired, however, additional images can be formed to capture or otherwise present the appearance of an incomplete properly-configured display 100. For example, when the display includes three vertically displaced shelves, a first such image can present the display with only the top shelf properly stocked with product, a second such image can present the display with only the top and middle shelf properly stocked with product, and the third such image can present the complete display (i.e., with all three shelves properly stocked with product).

At block 403 this process provides the aforementioned image (or images, as the case may be) and other information regarding the discrete loose components 101, 102 to a retail shopping facility 201 (for example, to the aforementioned control circuit 204 for the retail shopping facility 201 and/or directly to the control circuit 301 for the aforementioned mobile camera-equipped device 203). By one approach, and as an example, the aforementioned image source 207 can transmit this data via, for example, one or more intervening networks 208 such as the Internet. In this case, the image source 207 may comprise, for example, a properly configured server though other possibilities in these regards can certainly be accommodated.

The aforementioned other information regarding the discrete components 101, 102 can vary with the needs and/or opportunities that characterize a given application setting. By one approach, for example, this information can include identifying information for the products to be displayed (using, for example, stock-keeping unit (SKU) numbers as are known in the art). As another example, this information can include quantity information for the products to be displayed. Quantity information can be particularly helpful when the aforementioned images depict only the front product in each row of products such that the number of products in each row (from front to back) cannot be visually ascertained.

At optional block 404 this process 400 provides for forming an actual display 202 at the retail shopping facility 201 that includes components corresponding to the plurality of specified discrete loose components 101, 102 as correspond to the properly-configured display 100. For example, an associate can be provided with the aforementioned information and images and can employ that content to arrange the identified products in the predetermined configuration.

At block 405 this process 400 provides for using the aforementioned mobile camera-equipped device 203 to visually overlay a selected one of the aforementioned images over a view of the display 202. The view of the display 202 can be a live uncaptured image or a captured image as desired. Overlaying these two images (i.e., the image of the properly-configured display 100 and an image of the actual display 202 at the retail shopping facility 201) can readily and intuitively visually reveal mismatches where, for example, the display 202 is not properly configured.

Figure 5:
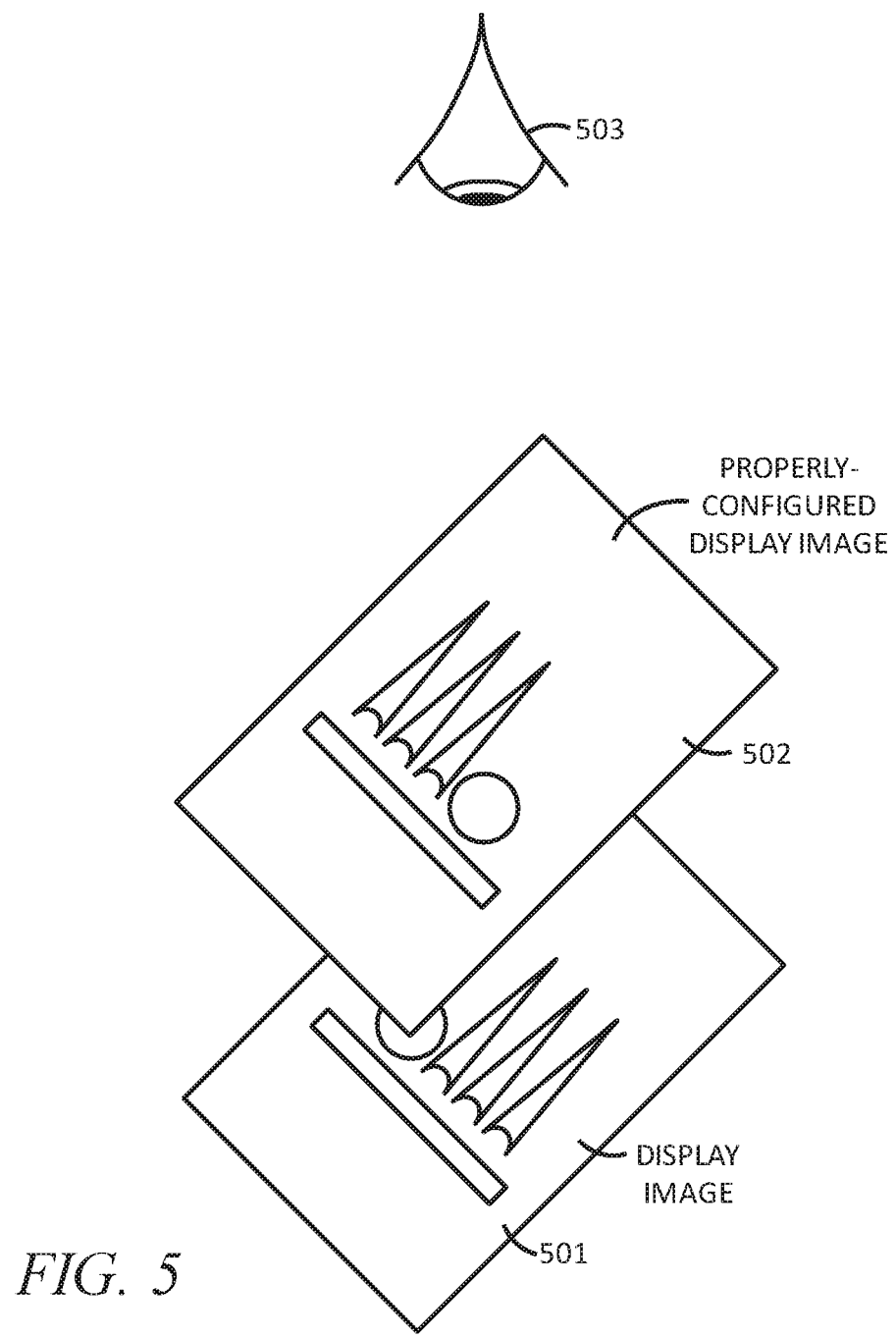
FIG. 5 comprises a perspective schematic diagram as configured in accordance with various embodiments of these teachings.

FIG. 5 provides a simple example in these regards. In this example, an associate 503 viewing the two overlaid images 501 and 502 can readily and easily discern that the products in the store display as shown in the actual display image 501 are horizontally backwards as compared to the products shown in the properly-configured display image 502.

At optional block 406 the translucency of the properly-configured display image 502 can be selectively controlled by the mobile camera-equipped device 203 (using, for example, the aforementioned user interface 306). Controlling the translucency of the overlying image can, in turn, make it easier to confirm that the two images are essentially the same (and hence that the actual display 202 is compliant) or to identify the discrepancies when such is not the case.

At block 407 this process 400 provides for determining whether the display 202 is properly configured based upon the foregoing facilitated comparison. When not true, the associate and/or others at the retail shopping facility 201 can take an appropriate response by, for example, correcting the display, training the associate, or otherwise as desired. When the comparison confirms that the display 202 is properly configured, the process can conclude (unless this process 400 is being used to confirm compliance before the display 202 is complete, in which case the process 400 can repeat from block 404 until the actual display 202 has been satisfactorily completed).

So configured, any number of pre-planned displays can be reliably constructed, even by associates having little training in these regards. Increased compliance in these regards, in turn, can help ensure proper leveraging of well-designed displays and corresponding promotions. These teachings can also be facilitated in a relatively cost-effective manner. The aforementioned mobile camera-equipped device 203, for example, may comprise a suitably equipped smart phone or tablet-style computer. These teachings are also implementable using either enterprise-owned mobile camera-equipped devices or associate-owned mobile camera-equipped devices as convenient or preferred.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
   specifying a first state of appearance of a properly-configured display that includes a plurality of discrete loose components;
   forming a first image that presents the first state of appearance of the completed properly-configured display;
   forming a second image that presents a second state of appearance of the display, wherein the second state of appearance is different from the first state of appearance;
   forming a third image that presents a third state of appearance of the display, wherein the third state of appearance is different from both the first state of appearance and the second state of appearance,
   providing the first, second, and third image and information regarding the discrete loose components to a retail shopping facility;
   forming a physical display at the retail shopping facility that includes components corresponding to the plurality of discrete loose components by:
      at a first point in time before concluding formation of the physical display is, using a mobile camera-equipped device to visually overlay the second image on a then-current image of the physical display to thereby facilitate comparing the then-current image of the physical display at the first point in time with the second state of appearance to thereby assess whether the physical display has been, so far, properly put together;
      at a second point in time following the first point in time and before concluding formation of the physical display, using the mobile camera-equipped device to visually overlay the third image on a then-current image of the physical display to thereby facilitate comparing the then-current image of the physical display at the second point in time with the third state of appearance to thereby assess whether the physical display has been, so far, properly put together, and
      at a third point of time following the second point in time, upon completing formation of the physical display, using the mobile camera-equipped device to visually overlay the first image over a then-current image of the physical display to thereby facilitate comparing the physical display with the first state of appearance of a properly-configured display to thereby assess whether the physical display is properly configured.

2. The method of claim 1 wherein the plurality of discrete loose components includes at least two different products.

3. The method of claim 2 wherein the plurality of discrete loose components includes a plurality of a first product and a plurality of a second product.

4. The method of claim 1 wherein the first and second images are at least partially translucent such that the physical display can be at least partially viewed through the image when the image is visually overlaid on the physical display.

5. The method of claim 4 wherein translucency of the image is selectively controllable by the mobile camera-equipped device.

6. The method of claim 1 wherein the information regarding the discrete loose components includes identifying information for products.

7. The method of claim 6 wherein identifying information for products includes corresponding stock-keeping unit (SKU) numbers.

8. The method of claim 6 wherein the information regarding the discrete loose components further includes quantity information for the products.

9. The method of claim 1 wherein forming the first, second, and third images comprises capturing corresponding digital photographic images of the physical display.

10. The method of claim 1 wherein forming the first, second, and third images comprises forming virtual representations of the display.

11. The method of claim 1 wherein forming at least one of the first, second, and third images comprises forming a plurality of images of the display using different fields of view.

12. The method of claim 11 wherein providing the first, second, and third images to the retail shopping facility comprises providing the plurality of images to the retail shopping facility.

13. The method of claim 12 wherein providing the plurality of images to the retail shopping facility includes, at least in part, providing the plurality of images to the mobile camera-equipped device.

14. The method of claim 1 wherein the physical display comprises an end-cap display.

* * * * *

UNITED STATES PATENT AND TRADEMARK OFFICE
CERTIFICATE OF CORRECTION

PATENT NO. : 11,429,926 B2
APPLICATION NO. : 15/429313
DATED : August 30, 2022
INVENTOR(S) : Greg A. Bryan, Eric A. Letson and John P. Thompson It is certified that error appears in the above-identified patent and that said Letters Patent is hereby corrected as shown below:

In the Claims

Claim 1, Column 7 Line 42 after "display" delete "is".

Signed and Sealed this
Tenth Day of January, 2023

Katherine Kelly Vidal
*Director of the United States Patent and Trademark Office*